United States Patent
Stiefenhofer et al.

(10) Patent No.: US 10,400,890 B2
(45) Date of Patent: Sep. 3, 2019

(54) METHOD AND CONTROL DEVICE FOR OPERATING A MOTOR VEHICLE

(71) Applicant: ZF Friedrichshafen AG, Friedrichshafen (DE)

(72) Inventors: Magnus Stiefenhofer, Amtzell (DE); Steffen Peine, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 90 days.

(21) Appl. No.: 15/833,323

(22) Filed: Dec. 6, 2017

(65) Prior Publication Data

US 2018/0172152 A1    Jun. 21, 2018

(30) Foreign Application Priority Data

Dec. 16, 2016 (DE) .................... 10 2016 225 326

(51) Int. Cl.
 *F16H 61/12* (2010.01)
 *F16H 61/16* (2006.01)
 (Continued)

(52) U.S. Cl.
 CPC ......... *F16H 61/12* (2013.01); *F16H 61/0403* (2013.01); *F16H 61/16* (2013.01);
 (Continued)

(58) Field of Classification Search
 CPC .. F16H 61/04; F16H 61/0403; F16H 61/0496; F16H 61/12; F16H 61/16;
 (Continued)

(56) References Cited

U.S. PATENT DOCUMENTS

| | | |
|---|---|---|
| 8,571,773 B2 | 10/2013 | Roth |
| 9,002,603 B2 | 4/2015 | Arnold et al. |

(Continued)

FOREIGN PATENT DOCUMENTS

| | | |
|---|---|---|
| DE | 102010024045 A1 | 12/2011 |
| DE | 102010063027 A1 | 6/2012 |

(Continued)

OTHER PUBLICATIONS

German Search Report DE102016225326.3, dated Sep. 26, 2017. (10 pages).

*Primary Examiner* — David R Morris
(74) *Attorney, Agent, or Firm* — Dority & Manning, P.A.

(57) ABSTRACT

A method for operating a motor vehicle having a transmission (1), the method including closing a first number of shift elements and opening a second number of shift elements in each selected, force locking gear ratio of the transmission (1); closing one shift element less, and therefore opening one shift element more than in a selected, force locking gear ratio when a transmission (1) is not force locking in the sailing mode; adjusting the respectively closed and opened shift elements as a function of at least one operating condition of the motor vehicle in the sailing mode; and checking, at least on the basis of the rotational speed of the transmission input shaft (2), whether a previously closed, positively locking shift element (A, F) to be opened is actually opened in the sailing mode during adjusting of the respectively closed and opened shift elements.

10 Claims, 2 Drawing Sheets

(51) Int. Cl.
*F16H 61/04* (2006.01)
*F16H 63/50* (2006.01)
*F16H 61/686* (2006.01)

(52) U.S. Cl.
CPC ......... *F16H 61/686* (2013.01); *F16H 63/502* (2013.01); *B60Y 2300/18083* (2013.01); *F16H 2061/0496* (2013.01); *F16H 2061/1208* (2013.01); *F16H 2061/161* (2013.01); *F16H 2200/2094* (2013.01); *F16H 2306/46* (2013.01); *Y02T 10/76* (2013.01)

(58) Field of Classification Search
CPC ........... F16H 61/686; F16H 2061/1208; F16H 2061/0496; F16H 2061/161; F16H 2306/46
See application file for complete search history.

(56) References Cited

U.S. PATENT DOCUMENTS

| | | | |
|---|---|---|---|
| 9,625,032 B2 * | 4/2017 | Maurer | F16H 61/04 |
| 9,656,670 B2 | 5/2017 | Mitsuyasu et al. | |
| 2011/0313631 A1 * | 12/2011 | Roth | B60W 10/11 |
| | | | 701/60 |
| 2013/0268168 A1 * | 10/2013 | Arnold | F16H 61/12 |
| | | | 701/58 |
| 2015/0127231 A1 * | 5/2015 | Maurer | F16H 61/04 |
| | | | 701/55 |
| 2015/0307102 A1 * | 10/2015 | Mitsuyasu | B60W 30/18172 |
| | | | 701/48 |
| 2018/0266548 A1 * | 9/2018 | Sohler | F16H 61/04 |

FOREIGN PATENT DOCUMENTS

| | | |
|---|---|---|
| DE | 102013213239 A1 | 1/2015 |
| DE | 112012007067 T5 | 8/2015 |
| DE | 102015220999 A1 | 4/2017 |
| WO | WO 2017/071913 A1 | 5/2017 |

* cited by examiner

METHOD AND CONTROL DEVICE FOR OPERATING A MOTOR VEHICLE

FIELD OF THE INVENTION

The invention relates generally to a method for operating a motor vehicle. Furthermore, the invention relates to a control device for operating a motor vehicle.

BACKGROUND

Transmissions of motor vehicles having shift elements, including both positively locking shift elements and frictionally locking shift elements, are known from practice. In each selected gear ratio of such a transmission, a first number of shift elements of the transmission is closed or engaged and a second number of shift elements of the transmission is opened or disengaged, wherein when a gear change from a current gear ratio into a target gear ratio is carried out, at least one previously closed shift element is opened or disengaged and at least one other previously opened shift element is closed or engaged.

If a positively locking shift element has to be closed or engaged in order to carry out a gear ratio change or a shift operation in the transmission, the positively locking shift element must close in a defined rotational speed window about a target differential rotational speed in order to avoid damage to the positively locking shift element. In order to ensure this closing within the defined rotational speed window, it is already known from practice to perform synchronization of the positively locking shift element, specifically by at least partially closing a frictionally locking shift element, in order to carry out a gear ratio change during which a positively locking shift element has to be closed or engaged.

In addition it is necessary to monitor whether a positively locking shift element which is to be opened is actually opened or disengaged in order to avoid over determinacy of the transmission. It is therefore possible when opening a positively locking shift element to bring about a seizure which can lead to a situation in which the positively locking shift element which is to be opened does not open.

It is also already known from practice to operate a motor vehicle with such a transmission in a sailing mode. In a sailing mode of the motor vehicle, the shift elements of the transmission are actuated such that one single shift element of the transmission less is closed, and therefore one single shift element of the transmission more is opened, than in a selected, force locking gear ratio.

In this context, it is also already known, in the sailing mode of the motor vehicle, to adjust or adapt or change the respectively closed and respectively opened shift elements of the transmission as a function of at least one operating condition of the motor vehicle, so that the sailing mode of the motor vehicle can be exited within the shortest possible time. During the adjustment of the respectively closed and respectively opened shift elements in the sailing mode, it may be necessary to open at least one previously closed, positively locking shift element of the transmission. This must be monitored.

DE 10 2013 213 239 A1 discloses a motor vehicle having a transmission which includes a plurality of positively locking shift elements and a plurality of frictionally locking shift elements. The positively locking shift elements are dogs and the frictionally locking shift elements are clutches and brakes. With the transmission known from DE 10 2013 213 239 A1 it is possible to make available in total nine forward gears and one reverse gear ratio. In this context, a converter is connected between a transmission input shaft of the transmission and a drive assembly.

SUMMARY OF THE INVENTION

The present invention is directed to providing a method for operating a motor vehicle and a control device for carrying out the method in order to check whether a positively locking shift element which is to be opened actually opens in the sailing mode.

According to the invention, when a previously closed, positively locking shift element of the transmission is opened in the sailing mode of the motor vehicle during the adjustment of the respectively closed and opened shift elements, the method includes checking, at least on the basis of the rotational speed of the transmission input shaft, whether the positively locking shift element which is to be opened is actually being disengaged or is in a disengaged state.

With the present invention, it is possible to check, in the sailing mode of the motor vehicle during the adjustment of the respectively closed and opened shift elements, whether a positively locking shift element which is to be opened during the adjustment of the shift elements is actually disengaged or opened. Faulty disengagement of a positively locking shift element can therefore be determined before this can be perceived at the output. If a faulty disengagement of a positively locking shift element is determined, an alternative measure can be initiated early in order to disengage the positively locking shift element and/or prevent closing of another shift element. In the case of faulty disengagement of a positively locking shift element, the comfort and the safety can be increased.

According to one advantageous development of the invention, when a first previously closed, positively locking shift element is opened in the sailing mode of the motor vehicle during the adjustment of the respectively closed and opened shift elements, it is checked whether the rotational speed of the transmission input shaft is zero or differs from zero by not more than a limiting value, wherein if the rotational speed of the transmission input shaft is zero or differs from zero by not more than the limiting value it is inferred that the first positively locking shift element to be opened is not being disengaged or is not in a disengaged state, whereas if the rotational speed of the transmission input shaft differs from zero by more than the limiting value, it is inferred that the first positively locking shift element to be opened is being disengaged or is in a disengaged state. This allows a particularly simple and advantageous way of checking whether a previously closed, positively locking shift element is actually disengaged during the sailing mode during the adjustment of the shift elements.

According to one advantageous development, on the basis of the rotational speed of the transmission output shaft of the transmission it is additionally checked whether the positively locking shift element to be opened of the transmission is actually being disengaged or is actually in a disengaged state. If a second or other previously closed, positively locking shift element of the transmission is opened in the sailing mode of the motor vehicle during the adjustment of the respectively closed and opened shift elements, it is preferably checked whether the rotational speed of the transmission input shaft and the rotational speed of the transmission output shaft are in a ratio with respect to one another which corresponds to a transmission ratio of a defined transmission gear ratio, wherein if the ratio of the rotational speed of the transmission input shaft to the rotational speed of the transmission output shaft corresponds to the transmission ratio or differs from the transmission ratio by not more than a limiting value, it is inferred that the second positively locking shift element to be opened is not being disengaged or is not in a disengaged state, whereas if the ratio of the rotational speed of the transmission input shaft and the rotational speed of the transmission output shaft differs from the transmission ratio of the defined transmission gear ratio by more than the limiting value, it is inferred that the second positively locking shift element to be opened is disengaged. In this way, it is also possible to check in a particularly advantageous way whether a positively locking shift element which is to be opened is actually disengaged in the sailing mode of the motor vehicle.

BRIEF DESCRIPTION OF THE DRAWINGS

Exemplary embodiments of the invention are explained in more detail with reference to the drawings without being restricted thereto. In the drawings, the following is shown.

DETAILED DESCRIPTION

Figures 1, 2:
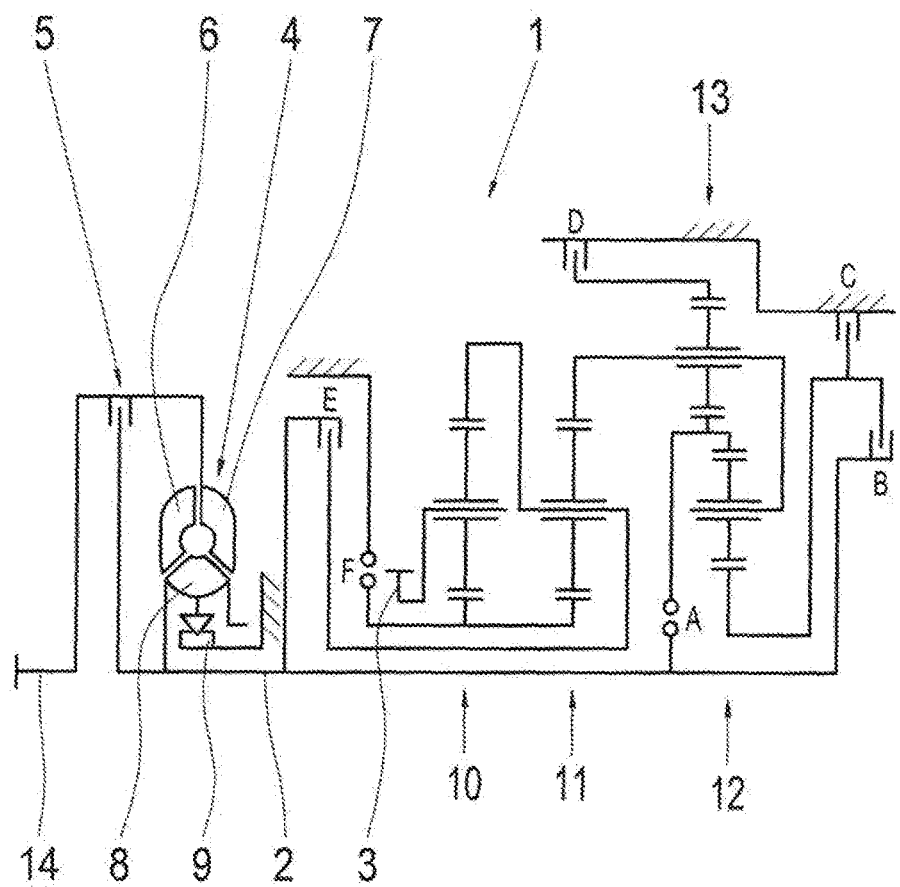
FIG. 1 shows a schematic illustration of a transmission of a motor vehicle together with a converter.
FIG. 2 shows a shift matrix of the transmission in FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The present invention relates to a method for operating a motor vehicle having an automatic or automated transmission and a control device for carrying out the method.

FIG. 1 shows a pattern of a transmission 1, preferably an automatic transmission, of a motor vehicle together with a converter 4, wherein the transmission 1 includes a transmission input shaft 2 and a transmission output shaft 3. The converter 4 has a converter lock-up clutch 5, a turbine wheel 6, a pump wheel 7, and a guide wheel 8, wherein the guide wheel 8 is connected to a freewheel 9. When the converter lock-up clutch 5 is closed, the turbine wheel 6 and the pump wheel 7 are coupled to one another. The transmission input shaft 2 corresponds to the converter output shaft and is coupled to the turbine 6 of the converter 4. An output is coupled to the transmission output shaft 3. A drive shaft 14 of a drive assembly is coupled to the converter input shaft.

Although in FIG. 1 the transmission input shaft 2 is coupled to the turbine wheel 6 of the converter 4 and the transmission input shaft 2 accordingly corresponds to the output shaft of the converter 4, an automatic transmission without such a converter is also usable where a separating clutch or launching clutch is connected between the transmission input shaft 2 and a drive shaft of a drive assembly.

The transmission 1 shown in FIG. 1 has a plurality of gear sets 10, 11, 12 and 13 as well as a plurality of shift elements A, B, C, D, E and F. In the exemplary embodiment shown, the transmission 1 accordingly includes six shift elements A to F, wherein the shift elements A and F are positively locking shift elements and the shift elements B, C, D and F are frictionally locking shift elements. In the exemplary embodiment shown, the frictionally locking shift elements B and E are clutches, and the frictionally locking shift elements C and D are brakes.

In each selected gear ratio in the transmission 1 in FIG. 1, a first number of shift elements are closed or engaged and a second number of shift elements are opened or disengaged.

The table in FIG. 2 specifies, for nine (9) of the available forward gears 1 to 9 and for the reverse gear ratio R, the respective shift elements which are closed or engaged and opened or disengaged in the respective gear ratio. In the table in FIG. 2, closed or engaged shift elements are each marked by X or (X). It follows from the table that in each selected gear in the transmission 1, three shift elements are closed or engaged and three shift elements are opened or disengaged.

If a motor vehicle having the drive train in FIG. 1 is operated in a sailing mode, one shift element of the transmission 1 less is closed, and therefore one shift element of the transmission 1 more is opened than in a selected, force locking gear ratio. In the shift matrix in FIG. 2, those shift elements which are opened in the sailing mode with a transmission 1 which is not force locking, are characterized for the respective gear ratio (X).

If sailing is carried out in the first forward gear ratio, the shift element D is then accordingly additionally opened in comparison with the first force locking forward gear ratio. If sailing is carried out in the second forward gear ratio, the shift element C is then additionally opened in comparison with the second force locking gear ratio. If sailing is carried out in the third forward gear ratio, the shift element B is then additionally opened in comparison with the third force locking forward gear ratio. If sailing is carried out in the forward gears 4 to 9, the shift element E is then additionally opened in comparison with the respective force locking forward gears 4 to 9. Accordingly, in each sailing gear ratio one shift element more is opened and accordingly one shift element less is closed than in a forward gear ratio which transmits tractive force.

In the sailing mode of the motor vehicle, those shift elements which are opened and closed in the respective sailing gear ratio are adjusted or adapted, to be a function of at least one operating condition of the motor vehicle, in particular of the rotational speed at the output 3.

If, for example, sailing is carried out at a particular time in the sailing gear ratio 4 with the shift element A closed and the shift element F closed and if changing over into the sailing gear ratio 5 is to take place, the shift element B is closed and the shift element F is opened. If a changeover is to occur from the sailing gear ratio 7 into the sailing gear ratio 8, the shift element A is then opened and the shift element C closed. During the sailing during the adjustment or adaptation of the respectively closed and opened shift elements of the transmission 1, it is accordingly necessary to open previously closed, positively locking switch elements A or F, specifically the positively locking shift element F in the case of the changeover from the sailing gear ratio 4 into the sailing gear ratio 5, and the positively locking shift element A in the case of the changeover from the sailing gear ratio 7 into the sailing gear ratio 8.

With the present invention it is proposed that if a previously closed, positively locking shift element A or F of the transmission is opened in the sailing mode of the motor vehicle during the adjustment of the respectively closed and opened shift elements, at least on the basis of the rotational speed of the transmission input shaft 2 which corresponds in the exemplary embodiment shown in FIG. 1 to the rotational speed of the turbine 6 of the converter 4, to check whether the positively locking shift element A or F which is to be opened is actually being disengaged or in a disengaged state.

If the previously closed, positively locking shift element A is to be opened in the sailing mode of the motor vehicle during the adjustment of the respectively closed and opened shift elements, for example in the case of a changeover from the sailing gear ratio 7 to the sailing gear ratio 8, it is then possible, in the exemplary embodiment shown of the transmission 1, to check exclusively on the basis of the rotational speed of the transmission input shaft 2 whether the positively locking shift element A which is to be opened is actually disengaged. If it is determined that the rotational speed of the transmission input shaft 2 is zero or approximately zero, it is inferred that the first positively locking shift element A which is to be opened is not in an engaged state, or has not been disengaged, for example at the changeover from the sailing gear ratio 7 to the sailing gear ratio 8, whereas if the rotational speed of the transmission input shaft 2 deviates from zero by more than a limiting value, it is inferred that the positively locking shift element A which is to be opened is actually in a disengaged state or has actually been disengaged.

If the shift elements C and D are respectively closed in the sailing gear ratio 8, and the shift elements B and D are respectively closed in the sailing gear ratio 9, the gear set 12 is in a stationary state or is locked, with the result that if the positively locking shift element A is also additionally still closed as a result of faulty opening of the positively locking shift element A, the transmission input shaft 2 is stationary and the rotational speed of the turbine 6 of the converter 4 is therefore zero or approximately zero. Approximately zero means that the rotational speed of the transmission input shaft 2 does not differ from zero by more than the limiting value. If, in the sailing mode of the motor vehicle during the adjustment of the shift elements which are opened and closed in the sailing mode, changing over accordingly occurs from the sailing gear ratio 7 to the sailing gear ratio 8 or to the sailing gear ratio 9, and in the process the positively locking shift element A is not correctly disengaged, it can be determined solely on the basis of the monitoring of the rotational speed of the transmission input shaft 2 that the positively locking shift element A which is to be opened is not in a disengaged state or has not been disengaged, specifically by virtue of the fact that the rotational speed of the transmission input shaft 2 zero or differs from zero by not more than a limiting value.

According to one advantageous development of the invention, checking as to whether a previously closed, positively locking element is actually in the disengaged state or is actually being disengaged in the sailing mode during the adjustment of the respectively closed and opened shift elements is carried out both on the basis of the rotational speed of the transmission input shaft 2 and additionally on the basis of the rotational speed of the transmission output shaft 3, specifically if, in particular at the changeover from the sailing gear ratio 4 to the sailing gear ratio 5 or at the changeover from the sailing gear ratio 3 to the sailing gear ratio 5, the positively locking shift element F is actuated to open, and accordingly is to be disengaged.

If the previously closed positively locking shift element F of the transmission is opened in the sailing mode of the motor vehicle during the adjustment of the respectively closed and opened shift elements, in particular at the changeover from the sailing gear ratio 3 to the sailing gear ratio 5, it is then checked whether the rotational speed of the transmission input shaft 2 and the rotational speed of the transmission output shaft 3 are in a ratio which corresponds to a transmission ratio of a defined transmission gear ratio, specifically a gear ratio in which the positively locking shift element F to be opened is closed.

If it is determined that the ratio between the rotational speed of the transmission input shaft 2 and the rotational speed of the transmission output shaft 3 corresponds to the transmission ratio or differs from the transmission ratio by not more than a limiting value, it is inferred that the second positively locking shift element F which is to be opened is not disengaged or is not in a disengaged state. On the other hand, if the ratio between the rotational speed of the transmission input shaft 2 and the rotational speed of the transmission output shaft 3 differs from the transmission ratio of the defined transmission gear ratio by more than the limiting value, it is inferred that the positively locking shift element F which is to be opened is disengaged or has been disengaged.

At the changeover from the sailing gear ratio 3 or 4 to the sailing gear ratio 5, it can accordingly be checked whether the ratio between the rotational speed of the transmission input shaft 2 and the rotational speed of the transmission output shaft 3 corresponds to the transmission ratio of the third forward gear. If this is the case, the shift element F is not correctly disengaged in the sailing mode during the adjustment of the respectively opened and closed shift elements.

Figure 3:
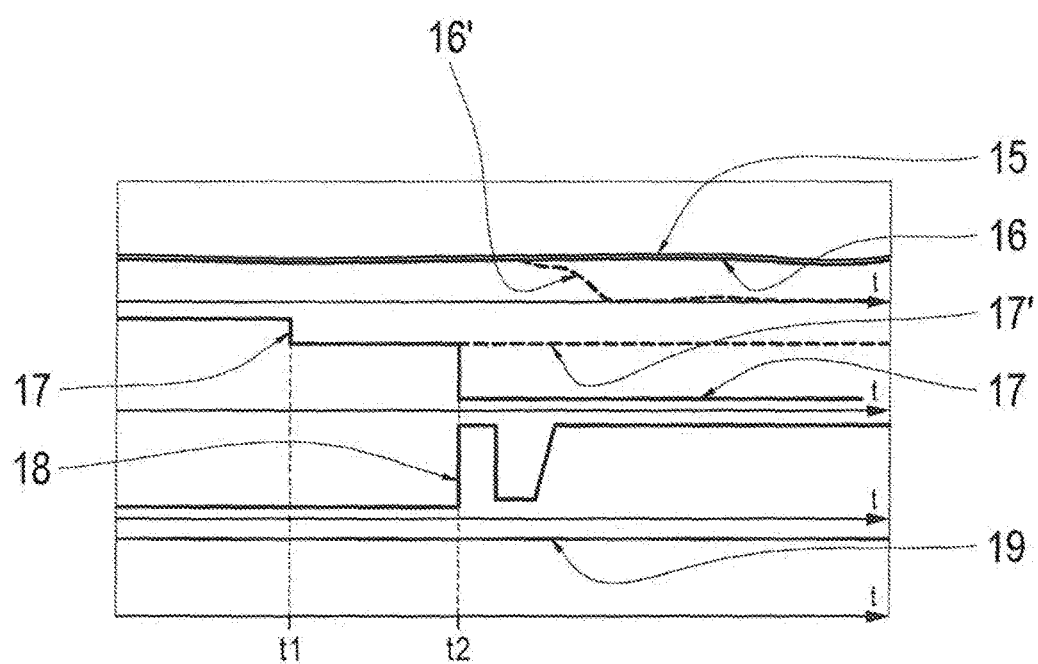
FIG. 3 shows time diagrams clarifying the method according to the invention for operating a transmission.

FIG. 3 shows a time diagram with curve profiles 15, 16, 17, 18 and 19 plotted against the time tin order to further clarify the invention, specifically for the case in which in the transmission in FIGS. 1 and 2 the positively locking shift element A is to be opened and the frictionally locking shift element C is to be closed in the sailing mode during the adjustment of the respectively opened and closed shift elements at the gear changeover from the sailing gear ratio 7 to the sailing gear ratio 8.

Therefore, the time curve profile 17 clarifies a state of the positively locking shift element A, the time curve profile 18 clarifies a state of the frictionally locking shift element C, and the curve profile 19 clarifies a state of the frictionally locking shift element D.

According to the curve profile 19, the frictionally locking shift element D remains completely closed at the changeover from the sailing gear ratio 7 to the sailing gear ratio 8.

According to the curve profile 17, at the changeover from the sailing gear ratio 7 to the sailing gear ratio 8 the positively locking shift element A is actuated at the time t1 to open, wherein the continuous line of the curve profile 17 indicates that at the time t2 the positively locking shift element A is disengaged, whereas the dashed line 17' of the curve profile 17 shows that the positively locking shift element A cannot be disengaged correctly but instead remains engaged in a type of intermediate position, e.g. as a result of a seizure.

At the time t2, according to the curve profile 18 the frictionally locking shift element C is actuated, by application of pressure, to close.

The curve profile 15 clarifies the rotational speed at the drive shaft 14, the curve profile 16 clarifies the rotational speed at the transmission input shaft 2, and respectively the rotational speed of the turbine 6 of the converter 4.

If according to the curve profile 17 the positively locking shift element A which is actuated to open can actually be opened, the rotational speed of the transmission input shaft 2 corresponds to the curve profile 16 which is shown by the continuous line profile in FIG. 3.

In contrast, if the positively locking shift element A which is actuated to open cannot be disengaged, the rotational speed at the transmission input shaft 2 corresponds to the dashed curve profile 16'.

FIG. 3 shows that if the positively locking shift element A cannot be disengaged correctly according to the curve profile 17' at the changeover from the sailing gear ratio 7 to the sailing gear ratio 8 and then the shift element C is also still closed in the sailing gear ratio 8, according to the curve profile 16' the rotational speed of the transmission input shaft 2 is zero or approximately zero, with the result that by monitoring the rotational speed of the transmission input shaft 2 it is then possible to monitor whether the positively locking shift element A is in a disengaged state or not.

The invention also relates to a control device for carrying out the method. This control device is, in particular, a transmission control device which performs open-loop and/or closed-loop control of the operation of the transmission 1 and of the converter 4. The control device has means for carrying out the method according to the invention, wherein these are hardware means and software means. The hardware means include data interfaces for exchanging data with the assemblies involved in the execution of the method according to the invention. For example, via the data interfaces the control device can actuate the shift elements A, B, C, D, E and F to open and close. In addition, the control device can then exchange data with rotational speed sensors, for example with a rotational speed sensor which is assigned to the transmission input shaft and a rotational speed sensor which is assigned to the transmission output shaft 3, via which rotational speed sensors the rotational speed of the transmission input shaft 2 and the rotational speed of the transmission output shaft 3 can then be made available to the control device. In addition, the hardware means include a processor for data processing and a memory for data storage. The software means are program modules for carrying out the method according to the invention. The control device carries out the method according to the invention on the control side and accordingly monitors, during the adjustment of the sailing gear ratios in the sailing mode, the rotational speed of the transmission input shaft 2 and preferably also the rotational speed of the transmission output shaft 3, in order to check on the basis of the rotational speeds whether during the adjustment of the sailing gear ratio a positively locking shift element which is actuated to open is actually disengaged or in a disengaged state.

Modifications and variations can be made to the embodiments illustrated or described herein without departing from the scope and spirit of the invention as set forth in the appended claims.

LIST OF REFERENCE SYMBOLS

1 Transmission
2 Transmission input shaft
3 Output shaft/transmission output shaft
4 Converter
5 Converter lock-up clutch
6 Turbine wheel
7 Pump wheel
8 Guide wheel
9 Free wheel
10 Gear set
11 Gear set
12 Gear set
13 Gear set
14 Drive shaft/converter input shaft
15 Curve profile
16 Curve profile
17 Curve profile
18 Curve profile
19 Curve profile
A Positively locking shift element
B Frictionally locking shift element
C Frictionally locking shift element
D Frictionally locking shift element
E Frictionally locking shift element
F Positively locking shift element

The invention claimed is:

1. A method for operating a motor vehicle having a transmission (1), the transmission (1) having a transmission input shaft (2), a transmission output shaft (3), and a plurality of shift elements, the plurality of shift elements including at least one positively locking shift element (A, F) and a plurality of frictionally locking shift elements (B, C, D, E), a first number of shift elements of the plurality of shift elements closed or engaged and a second number of shift elements of the plurality of shift elements opened or disengaged in each selected, force locking gear ratio of the transmission (1), the method comprising:

closing one less shift element of the plurality of shift elements closed and opening one more shift element of the plurality of shift elements than in a selected, force locking gear ratio when the transmission (1) is not force locking in a sailing mode of the motor vehicle;

adjusting or changing the one less closed shift element of the plurality of shift elements closed and the one more opened shift element of the plurality of shift elements as a function of at least one operating condition of the motor vehicle in the sailing mode of the motor vehicle; and checking, based at least in part on a rotational speed of the transmission input shaft (2), whether a previously closed, positively locking shift element (A, F) of the at least one positively locking shift element which is to be opened is actually being disengaged or in a disengaged state when the previously closed, positively locking shift element (A, F) of the at least one positively locking shift element is opened in the sailing mode of the motor vehicle during said step of adjusting or changing.

2. The method according to claim 1, further comprising:

checking whether the rotational speed of the transmission input shaft (2) is zero or differs from zero by not more than a limiting value when a first previously closed, positively locking shift element (A) of the at least one positively locking shift element (A, F) is opened in the sailing mode of the motor vehicle during said step of adjusting or changing;

determining that the first positively locking shift element (A) to be opened is not being disengaged or is not in the disengaged state when the rotational speed of the transmission input shaft (2) is zero or differs from zero by not more than the limiting value; and determining that the first positively locking shift element (A) to be opened is being disengaged or is in the disengaged state when the rotational speed of the transmission input shaft (2) differs from zero by more than the limiting value.

3. The method according to claim 1, further comprising checking whether the positively locking shift element (A, F) to be opened is actually being disengaged or is in the disengaged state based at least in part on a rotational speed of the transmission output shaft (3) of the transmission (1).

4. The method according to claim 3, further comprising:
determining a ratio of the rotational speed of the transmission input shaft (2) to the rotational speed of the transmission output shaft (3), the ratio corresponding to a transmission ratio of a defined transmission gear ratio, when a second, previously closed, positively locking shift element (F) of the at least one positively locking shift element (A, F) is opened in the sailing mode of the motor vehicle during said step of adjusting or changing;
determining that the second positively locking shift element (F) to be opened is not being disengaged or is not in the disengaged state when the ratio of the rotational speed of the transmission input shaft (2) to the rotational speed of the transmission output shaft (3) corresponds to the transmission ratio or differs from the transmission ratio by not more than a limiting value; and
determining that the second positively locking shift element (F) to be opened is being disengaged or is in the disengaged state when the ratio of the rotational speed of the transmission input shaft (2) to the rotational speed of the transmission output shaft (3) differs from the transmission ratio of the defined transmission gear ratio by more than the limiting value.

5. The method according to claim 4, wherein the transmission ratio of the defined transmission gear ratio corresponds to a gear ratio of the transmission (1) in which the second positively locking shift element (F) to be opened is closed.

6. The method according to claim 1, wherein the motor vehicle also has a converter (4), a turbine (6) of the converter (4) coupled to the transmission input shaft (2) of the transmission (1), and a rotational speed of the turbine (6) is monitored in order to monitor the rotational speed of the transmission input shaft (3).

7. A control device of a motor vehicle having a transmission (1), the transmission (1) comprising a transmission input shaft (2), a transmission output shaft (3), and a plurality of shift elements, the plurality of shift elements including at least one positively locking shift element (A, F) and a plurality of frictionally locking shift elements (B, C, D, E), a first number of shift elements of the plurality of shift elements closed and a second number of shift elements of the plurality of shift elements opened in each selected force locking gear ratio of the transmission (1), one less shift element of the plurality of shift elements closed and one more shift element of the plurality of shift elements opened than in a selected, force locking gear ratio in a sailing mode of the motor vehicle when the transmission (1) not force locking, the controller configured for:
adjusting the one less closed shift element of the plurality of shift elements and the one more opened shift element of the plurality of shift elements as a function of at least one operating condition of the motor vehicle in the sailing mode of the motor vehicle; and
checking, based at least in part on a rotational speed of the transmission input shaft (2), whether a previously closed, positively locking shift element (A, F) of the at least one positively locking shift element (A, F) which is to be opened is actually being disengaged or is in a disengaged state when the control device adjusts the one less closed shift element of the plurality of shift elements and the one more opened shift element of the plurality of shift elements in the sailing mode of the motor vehicle.

8. The control device according to claim 7, wherein the control device is further configured for:
checking whether the rotational speed of the transmission input shaft (2) is zero or differs from zero by not more than a limiting value when the control device actuates a first previously closed, positively locking shift element (A) of the at least one positively locking shift element (A, F) to open during the adjusting of the one less closed shift element of the plurality of shift elements and the one more opened shift element of the plurality of shift elements in the sailing mode of the motor vehicle;
determining that the first positively locking shift element (A) is not being disengaged or is not in the disengaged state when the rotational speed of the transmission input shaft (2) is zero or differs from zero by not more than the limiting value; and
determining that the first positively locking shift element (A) is being disengaged or is in the disengaged state when the rotational speed of the transmission input shaft (2) differs from zero by more than the limiting value.

9. The control device according to claim 7, wherein the control device is configured for checking whether the positively locking shift element (A, F) which is to be opened is being disengaged or is in the disengaged state based at least in part on a rotational speed of the transmission output shaft (3).

10. The control device according to claim 9, wherein the control device is further configured for:
determining a ratio of the rotational speed of the transmission input shaft (2) to the rotational speed of the transmission output shaft (3), the ratio corresponding to a transmission ratio of a defined transmission gear ratio, when the control device actuates a second previously closed, positively locking shift element (F) of the at least one positively locking shift element (A, F) to open during the adjusting of the one less closed shift element of the plurality of shift elements and the one more opened shift element of the plurality of shift elements in the sailing mode of the motor vehicle;
determining that the second positively locking shift element (F) is not disengaged or is not in the disengaged state when the ratio of the rotational speed of the transmission input shaft (2) to the rotational speed of the transmission output shaft (3) corresponds to the transmission ratio or differs from the transmission ratio by not more a limiting value; and
determining that the second positively locking shift element (F) is being disengaged or in the disengaged state when the ratio of the rotational speed of the transmission input shaft (2) to the rotational speed of the transmission output shaft (3) differs from the transmission ratio by more than the limiting value.

* * * * *